S. BUCHSBAUM.
BELT BUCKLE.
APPLICATION FILED OCT. 14, 1920.

1,393,425.

Patented Oct. 11, 1921.

Inventor
Samuel Buchsbaum.
by Gabel & Mueller
Attys

UNITED STATES PATENT OFFICE.

SAMUEL BUCHSBAUM, OF CHICAGO, ILLINOIS.

BELT-BUCKLE.

1,393,425. Specification of Letters Patent. Patented Oct. 11, 1921.

Application filed October 14, 1920. Serial No. 416,931.

*To all whom it may concern:*

Be it known that I, SAMUEL BUCHSBAUM, a citizen of the United States, residing at Chicago, in the county of Cook and State of Illinois, have invented a certain new and useful Improvement in Belt-Buckles, of which the following is a full, clear, concise, and exact description, reference being had to the accompanying drawings, forming a part of this specification.

My invention relates to belt buckles or buckles used for similar purposes, and has for its object the provision of an improved device of this character which is more particularly an improvement over the structure disclosed in my prior Patent No. 1,272,206, dated July 9, 1918.

The structure of my present application contemplates a belt buckle of the general character described in the said patent but provides new and improved means for holding one belt extremity firmly in position, and also new and improved gripping mechanism for retaining the free belt tongue in any given desired position.

Figure 1:
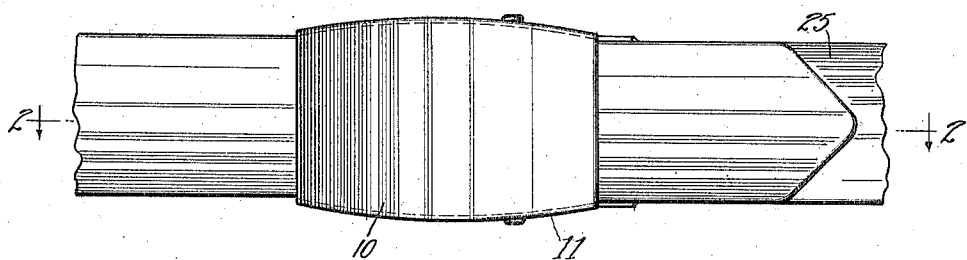
Figure 2:
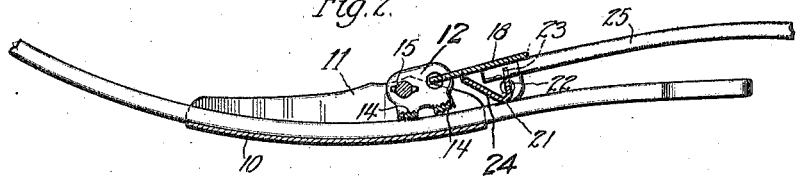
Figure 3:
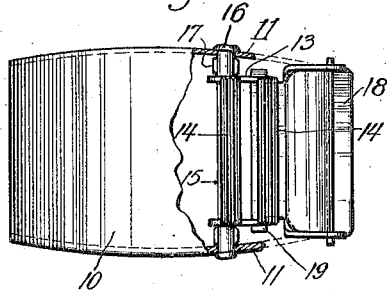
Figure 4:
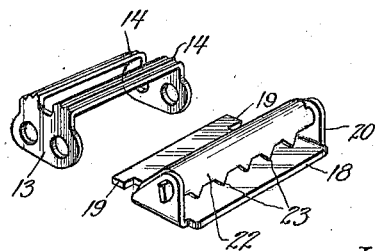

I will explain my invention more in detail by referring to the accompanying drawing, in which Figure 1 is a front view partly in section of the belt and buckle structure; Fig. 2 is a view partly in section along line 2—2 of Fig. 1;

Fig. 3 is a view similar to that of Fig. 1 with the belt removed, a portion of the front plate being broken away to more clearly reveal features of construction; and Fig. 4 is a perspective view of the belt clamping element.

My improved device consists of the front plate 10 having side walls 11—11, which carry a suitable gripping element 12. This gripping element consists of a bridge structure having the side walls 13—13 which are bridged by two serrated gripping jaws 14—14. The front plate 10 carries a spindle 15 riveted in position, as shown at 16, upon which spindle the gripping device 12 is rotatably carried, the spindle passing through the side walls 13 of said gripping element. The spindle 15 is enlarged as shown at 17, preferably by having certain parts thereof pressed outwardly after the gripping element is mounted thereon, thus to avoid end thrust or side play of the gripping element. A clamping structure is pivotally mounted upon the gripping element and consists of a plate 18 having protruding stems 19 which find a bearing in holes provided in the side walls of the gripping element 12. The clamping structure 18 also has side walls 20—20 which pivotally support the clamp 21. This clamp has the toothed wall 22 provided with teeth 23 and also has the tail piece 24. The belt extremity 25 is permanently clamped in position in the clamping structure by the teeth 23 which clamp the belt against the plate 18. The free extremity of the belt is adapted to be inserted between the rear face of the front plate 10 and the gripping structure 12. The gripping structure will grip the free extremity of the inserted belt in any given desired position. The gripping faces 14 extend across practically the entire width of the front plate and thus serve to more substantially hold the free belt tongue in position.

The clamping structure heretofore described, provides improved means for holding the belt in position, in that I have provided a pivotal mounting for the belt without the necessity of looping the belt as shown in my prior patent above referred to. The belt being held by the teeth 23 is by virtue of its own flexibility pivotally or swingingly held in position. The clamping structure firmly holds the belt extremity in place. The arrangement of the elements is such that the forward gripping surface 14 which engages the belt in advance of the second gripping surface, actually holds the belt tongue in position against displacement, as the belt is not supposed to be of sufficient thickness to permit the forward or first engaging gripping surface to pass beyond dead center under the spindle 15. By carrying the gripping surfaces so that they extend practically throughout the entire width of the front plate the free belt tongue is held firmly in position against lateral displacement, and furthermore, the strain upon said tongue is equal across the entire width of the belt. The simplified clamping structure makes it more easy to remove a belt and insert another one, as it is very frequently desirable to have a plurality of belts of different style which can be readily inserted in position or removed as occasion requires. Furthermore, it is a simple matter to decrease the length of the belt when desired by merely cutting off a portion of the extremity which is to be held in place by the clamping structure.

From what has been described the nature of my invention will be readily clear and it will be understood that a simplified structure is provided for devices of this nature.

Having, however, thus described one form which my invention may take what I claim as new and desire to secure by Letters Patent is:

1. A device of the character described, comprising a front plate, a gripping element pivotally carried by said front plate and adapted to grip a free belt tongue and hold it in place against the rear face of said front plate, said gripping element extending across substantially the entire width of said front plate, and consisting of two separated gripping surfaces, and upstanding side walls and a belt clamping structure pivotally carried by said gripping element at its side walls, said belt clamping structure including a plate-like element and a clamp pivotally carried thereby.

2. A device of the character described, comprising a front plate having side walls, a gripping element comprising a body portion having two separated gripping surfaces extending transversely across the rear face of said plate and having side walls, said gripping element being pivotally supported between the side walls of said front walls, and a belt clamping structure pivotally carried by the body portion of said gripping element between the side walls thereof, said belt clamping structure including a plate-like element and a toothed clamp pivotally carried thereby, said gripping surfaces being arranged on said plate so that one of said gripping surfaces engages with said plate prior to the other thereof.

3. A device of the character described, comprising a front plate, a gripping element comprising a body portion pivotally carried by said front plate, said gripping element being adapted to grip a free belt tongue and hold it in place against the rear face of said front plate, said gripping element extending across substantially the entire width of said front plate, and consisting of two separated gripping surfaces and side wall portions and a belt clamping structure pivotally carried by the body portion of said gripping element between the side walls thereof, said belt clamping structure including a plate-like element having side flanges and a toothed clamp pivotally carried thereby between said side flanges.

4. A device of the character described comprising a front plate having side walls, a gripping element extending transversely across the rear face of said plate, a pivot pin for said gripping element carried between said side walls, and a belt clamping structure pivotally carried by said gripping element, said pivot pin being provided with integral means for preventing side play of said gripping element.

5. A device of the character described comprising a front plate having side walls, a gripping element extending transversely across the rear face of said plate, a pivot pin for said gripping element carried between said side walls, and a belt clamping structure having side walls pivotally carried by said gripping element, said pivot pin having projections formed thereon between the side walls of said gripping element and side walls of said plate for preventing side play of said gripping element.

In witness whereof, I hereunto subscribe my name this 8th day of October, A. D., 1920.

SAMUEL BUCHSBAUM.